(12) United States Patent
Pala

(10) Patent No.: US 12,028,324 B1
(45) Date of Patent: Jul. 2, 2024

(54) SYSTEMS AND METHODS FOR ADVANCED CHAINED AUTHENTICATIONS AND AUTHORIZATIONS

(71) Applicant: CABLE TELEVISION LABORATORIES, INC., Louisville, CO (US)

(72) Inventor: Massimiliano Pala, Denver, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 75 days.

(21) Appl. No.: 17/365,659

(22) Filed: Jul. 1, 2021

Related U.S. Application Data

(60) Provisional application No. 63/192,885, filed on May 25, 2021, provisional application No. 63/144,927, filed on Feb. 2, 2021, provisional application No. 63/046,831, filed on Jul. 1, 2020.

(51) Int. Cl.
*H04L 29/06* (2006.01)
*H04L 9/40* (2022.01)

(52) U.S. Cl.
CPC .................... *H04L 63/08* (2013.01)

(58) Field of Classification Search
CPC ........................................................ H04L 63/08
See application file for complete search history.

(56) References Cited

U.S. PATENT DOCUMENTS

| 8,001,381 | B2* | 8/2011 | Metke | G06F 21/445 |
| | | | | 713/169 |
| 10,205,595 | B2* | 2/2019 | Frascadore | H04L 9/0662 |
| 10,250,590 | B2* | 4/2019 | Gryb | H04W 60/00 |
| 10,454,904 | B2* | 10/2019 | Huh | H04L 9/3242 |
| 11,115,217 | B2* | 9/2021 | Shekh-Yusef | H04L 9/3263 |
| 11,171,964 | B1* | 11/2021 | Huang | H04L 9/3247 |
| 11,405,789 | B1* | 8/2022 | Wei | H04W 4/50 |
| 11,599,862 | B1* | 3/2023 | Hecht | G06Q 20/102 |
| 2002/0199001 | A1* | 12/2002 | Wenocur | H04L 51/00 |
| | | | | 709/227 |
| 2003/0172269 | A1* | 9/2003 | Newcombe | H04L 63/0428 |
| | | | | 713/168 |
| 2009/0031141 | A1* | 1/2009 | Pearson | G06F 21/57 |
| | | | | 713/187 |
| 2009/0163176 | A1* | 6/2009 | Hasegawa | H04L 63/083 |
| | | | | 455/411 |
| 2010/0049975 | A1* | 2/2010 | Parno | H04L 63/1483 |
| | | | | 713/168 |
| 2010/0161817 | A1* | 6/2010 | Xiao | H04L 67/1046 |
| | | | | 709/229 |

(Continued)

*Primary Examiner* — Mahfuzur Rahman
(74) *Attorney, Agent, or Firm* — Armstrong Teasdale LLP

(57) ABSTRACT

A server device is provided for authenticating client devices on a communication network. The server device includes a transceiver configured for operable communication with at least one client of the communication network, and a processor including a memory configured to store computer-executable instructions. When executed by the processor, the instructions cause the server device to transmit one or more messages of an authentication exchange with a client device, transmit a server Registration Authorization Token (RAT) associated with the server device to the client device, receive from the client device a client RAT associated with the client device, and store the client RAT.

20 Claims, 6 Drawing Sheets

(56) References Cited

U.S. PATENT DOCUMENTS

| | | | |
|---|---|---|---|
| 2011/0010547 A1* | 1/2011 | Noda | H04L 9/321 |
| | | | 713/168 |
| 2013/0310006 A1* | 11/2013 | Chen | H04W 12/04 |
| | | | 455/411 |
| 2013/0318343 A1* | 11/2013 | Bjarnason | H04L 41/0809 |
| | | | 713/157 |
| 2017/0034133 A1* | 2/2017 | Korondi | H04L 63/083 |
| 2017/0063834 A1* | 3/2017 | Gryb | H04L 63/083 |
| 2018/0026982 A1* | 1/2018 | Wei | H04W 12/08 |
| | | | 726/4 |
| 2018/0041497 A1* | 2/2018 | Morishita | H04L 67/146 |
| 2019/0123901 A1* | 4/2019 | Vijayanarayanan | |
| | | | H04L 9/0841 |
| 2019/0245690 A1* | 8/2019 | Shah | H04J 3/0667 |
| 2019/0373471 A1* | 12/2019 | Li | H04L 63/0853 |
| 2021/0044976 A1* | 2/2021 | Avetisov | G06F 21/64 |
| 2021/0099292 A1* | 4/2021 | Gilton | H04L 9/3273 |
| 2022/0094675 A1* | 3/2022 | Madisetti | H04L 9/14 |
| 2023/0206198 A1* | 6/2023 | Hecht | G06F 3/0485 |
| | | | 705/40 |

* cited by examiner

SYSTEMS AND METHODS FOR ADVANCED CHAINED AUTHENTICATIONS AND AUTHORIZATIONS

CROSS REFERENCE TO RELATED APPLICATIONS

This application claims the benefit of and priority to U.S. Provisional Application No. 63/046,831, filed Jul. 1, 2020, entitled "CHAINED AUTHENTICATIONS AND AUTHORIZATIONS," U.S. Provisional Application No. 63/144,927, filed Feb. 2, 2021, entitled "MECHANISM FOR MULTIPROTOCOL NONCEs CHAINING, "and U.S. Provisional Application No. 63/192,885, filed May 25, 2021, entitled "CHAINED AUTHENTICATIONS AND AUTHORIZATIONS," which are hereby incorporated by reference in their entirety.

BACKGROUND

The field of the invention relates generally to advanced security protocols settings, and more specifically, to systems and methods for NONCEs and registration tokens to prove real-time authentication and authorization for devices on networks.

Theft of service and, in general, credentials sharing and is a problem in many service-oriented industries. Specifically, for Access Networks, the possibility to clone (or share) device (or account) credentials is a problem that affects operators across the world. In order to be able to associate user access with an account, service providers require devices to securely authenticate to the network with separate identities. However, credentials can be compromised and/or actively shared across entities to be able to steal services or commit illegal activities.

There exist anti-share and anti-cloning solutions that use different types of techniques to try to identify if a device with legitimate credentials is actually the cloned device or the original one. Some existing solutions use the authentication traces to look for specific patterns and/or the well-known values of the credentials. Other existing solutions focus on fingerprinting techniques to understand if a device is a clone or an original one. In general, however, existing solutions are based on the deployment of complex systems and databases to try to identify which is the original one, to apply extra filtering. Simpler and less expensive techniques for identifying devices would be advantageous.

SUMMARY

In an embodiment, a server device is provided for authenticating client devices on a communication network. The server device includes a transceiver configured for operable communication with at least one client of the communication network, and a processor including a memory configured to store computer-executable instructions. When executed by the processor, the instructions cause the server device to transmit one or more messages of an authentication exchange with a client device, transmit a server Registration Authorization Token (RAT) associated with the server device to the client device, receive from the client device a client RAT associated with the client device, and store the client RAT.

In an embodiment, a server device is provided for facilitating communication between devices on a plurality of networks. The server device includes a transceiver configured for operable communication with at least one client of a first communication network and an external computer device of a second communication network, and a processor including a memory configured to store computer-executable instructions. When executed by the processor, the instructions cause the server device to establish a connection with a client device on the first communication network, and receive a first message from the client device. The first message includes at least a first NONCE and a second NONCE. The instructions further cause the server device to transmit a second message to the external computer device on the first communication network. The second message is based on the first message, and the second message includes the first NONCE. The instructions further cause the server device to receive a third message from the external computer device. The third message is in response to the second message, and the third message includes the first NONCE. The instructions further cause the server device to transmit a fourth message to the client device. The fourth message includes the second NONCE and at least a portion of the third message.

In an embodiment, a server device is provided for facilitating communication between devices on a plurality of networks. The server device includes a transceiver configured for operable communication with at least one client of a first communication network and an external computer device of a second communication network, and a processor including a memory configured to store computer-executable instructions. When executed by the processor, the instructions cause the server device to establish a connection with a client device on the first communication network, and receive a first message from the client device. The first message includes a first NONCE. The instructions further cause the server device to generate a second NONCE using an algorithm and the first NONCE, and transmit a second message to the external computer device on the first communication network. The second message is based on the first message, and the second message includes the second NONCE. The instructions further cause the server device to receive a third message from the external computer device. The third message is in response to the second message, and the third message includes the second NONCE. The instructions further cause the server device to transmit a fourth message to the client device. The fourth message includes the second NONCE, the first NONCE, and at least a portion of the third message.

BRIEF DESCRIPTION

These and other features, aspects, and advantages of the present disclosure will become better understood when the following detailed description is read with reference to the following accompanying drawings, in which like characters represent like parts throughout the drawings.

Figure 1:
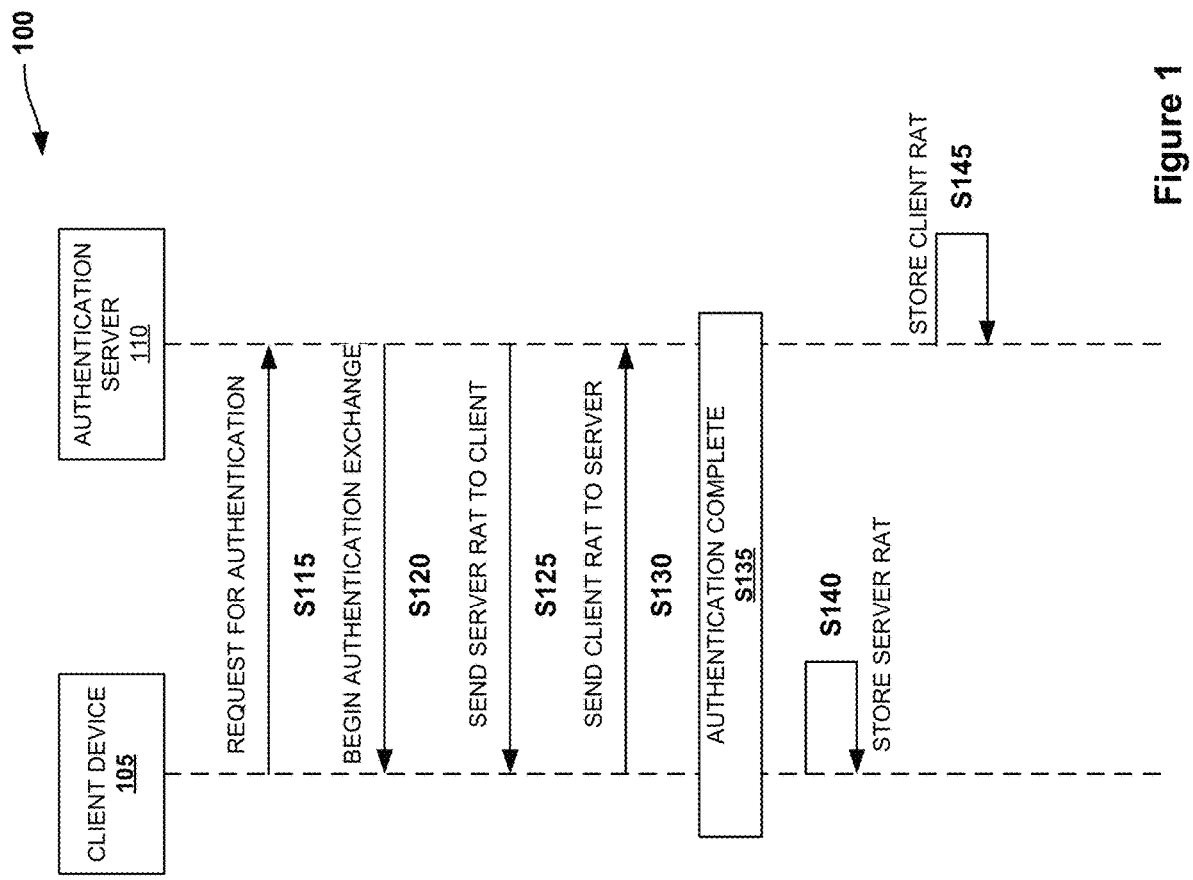
FIG. 1 illustrates a timing diagram of a process for sharing registration tokens between devices during authentication in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments relate generally to advanced security protocols settings, and more specifically, to systems and methods for NONCEs and registration tokens to prove real-time authentication and authorization for devices on networks. For ease of explanation, the following description may generically refer to these several innovative embodiments as "the advanced chained authentication and authorization system" (ACAAS) The advanced chained authentication and authorization system herein enables the user, consumer, and/or customer to increase the difficulty of outside systems and actors from using compromised credentials. In particular, the present embodiments may include one or more additions to existing protocols to limit the required changes to implement this advanced chained authentication and authorization system, while still supporting existing systems.

The advanced chained authentication and authorization system introduces the concept of Chained Authentications and Authorizations, where one or more unique values from the registration process (or first authentication) are used in subsequent authentications to verify that the entity using specific credentials is the same entity that registered them in the first place. The present advanced chained authentication and authorization system leverages the secrets derived during the device registration process (implicit or explicit) that can be used in subsequent authentications to prove the credentials used to register the device were first used on the specific device even when the credentials were originally shared.

The system makes use of the initial device registration step to provide a secret that is used in subsequent authentication to prove it is the same device that was originally registered with the network. Moreover, the system allows for the device to provide a value to the network in order to provide the same protection for the device. This last feature is specific for network topology where devices tend to authenticate always to the same network device (like a CMTS) after the initial registration (i.e., Cable or Home networks). This approach can be applied to any access networks—DOCSIS, 3gpp, WiFi, etc.

Specifically, the system focuses on the possibility to provide, on top of device or account credentials, a registration validation token that can be combined with the authentication process to allow the other party (both for client and server authentication) to verify if the same credentials have been previously used by that device when first registered.

For the purposes of this disclosure the symbol ("|") is used through this document to indicate the concatenation of two values. Specifically, when indicating the concatenation of values A and B, this document uses the following notation: {A|B} The symbols ("{") and ("}") indicate the beginning and end of a logical record.

The advanced chained authentication and authorization system leverages the initial device registration step to provide a secret value or token that is used in subsequent authentication processes. Only the device that initially registered to the network will be then capable to authenticate after registration because of the use of this extra value that was not available to the device before that. Other devices, even if they have the same device credentials will not be able to authenticate to the network (or the network can detect that this is not the device that registered originally) because they do not possess the right authentication token.

The advanced chained authentication and authorization system is configured to be completely symmetrical. This means that not only the server can verify that the device is the one that registered with the network, but also that the client can leverage the same mechanism to make sure that the network is the one it registered with before. This last feature is particularly useful for network topologies where client devices always authenticate (unless special events occur) to the same network (like a CMTS) after the initial registration (i.e., Cable or Home networks) or when the initial registration tokens can be securely shared across the access network the device is authenticating to.

The advanced chained authentication and authorization system can be deployed in environments where the need to verify that the entity that is authenticating with a set of credentials is the same entity that originally registered them. For instance, this invention can provide protection against public AP spoofing and/or 3GPP base stations spoofing. The advanced chained authentication and authorization system can also be used to validate the registration status when communicating to the Cloud infrastructure. The advanced chained authentication and authorization system can further be used to allow sharing credentials but still being able to differentiate among the entities that are using the shared credentials. In addition, the advanced chained authentication and authorization system includes the possibility of updating the values for the registration authorization after successful authorization to prevent the perpetual use of compromised Registration Authorization Tokens.

Modern authentication protocols allow for NONCE values to be used to make sure the authentication messages are fresh and that no malicious user can successfully Man-In-The Middle (MITM) attack by replying pre-recorded messages to the victims (both clients and servers). The advanced chained authentication and authorization systems use of secret values exchanged during the registration process and combines them with NONCE values used in the protocol(s) to provide session-specific authorization information.

A further aspect of using the system provided NONCEs is also used for providing a feature of a freshness guarantee for chained messages. In order to provide access to resources and the exchange of messages, different protocols implement different protections against malicious actors that want to alter the behavior of the system by changing the contents of the messages or by storing and then reply messages to try to maliciously change the behavior of the system. Such protective measures include the use of cryptographic algorithms to authenticate the participating parties, encrypt the data, and check for integrity.

Especially in cryptographic protocols (but not only), one of the attacks that is protected against is the so called "Reply-Attack" where a malicious user, even if he/she cannot produce the message because of its security controls (e.g., it is signed and/or encrypted with keys that are unknown by the attacker), stores a message for some time and then tries to subvert a protocol by injecting the message in a subsequent session in order to gain some advantage and/or lower the security properties of the system.

For example, a typical attack against revocations in PKIs is the storing of an OCSP response related to a certificate for long time. In this example, the certificate is valid. A few months later the attacker gain access to the private key associated with the certificate. Even if the certificate is revoked, the attacker can try to interject the traffic between two parties and try to provide the OCSP response where the certificate is marked as valid (e.g., via OCSP stapling). This would cause the party in the communication to think that the certificate is valid even though the certificate is now revoked. Although OCSP responses have validity period (it is time-bound), the availability of secure or accurate time is not always available to parties (e.g., devices trying to access the network).

Based on the above example, a device that is accessing the network (e.g., a CMTS, a CCap Core, a cable modem, a mobile phone, a WiFi client, a Smart Device, etc.) has to typically rely on the network to provide all the information for authentication because the device does not have full Internet access yet. The parties communicating through the network-protocol (e.g., DOCSIS) need a way to make sure that messages from other protocols that are needed by the communicating parties (e.g., OCSP) are protected against "Reply-Attacks".

An advanced NONCE system described herein, describes two methods to extend the use of NONCEs to the additional protocols used, whenever they support a Reply-Attack protection mechanism.

FIG. 1 illustrates a timing diagram of a process 100 for sharing registration tokens between devices during authentication in accordance with at least one embodiment. In the exemplary embodiment, a client device 105 and an authentication server 110 are in communication over a computer network. In the exemplary embodiment, client device 105 is first connecting to authentication server 110 and transmits S115 a request for authentication. The authentication server 110 begins S120 the authentication exchange. In this embodiment, the server 110 transmits S125 a server Registration Authorization Token (RAT) to the client device 105. In step S130 the client device 105 transmits a client Registration Authorization Token (RAT) to the authentication server 110. In step S135, the Authentication has completed successfully. In step S140, the client device 105 stores the server RAT. In step S145, the server device 110 stores the client RAT.

The value used for the Registration Authorization Token or RAT should also be tied to the long-term identity of the communicating party. In other words, the registration token shall be such that the receiving party will reject it if used with a different network identity. For example, the RAT shall be stored together with the identity associated with the communicating party in the form of (but not limited to) an hash of a certificate, the hash of a username, the hash of an e-mail address, the hash of a phone number, the hash of an IMSI value, a certificates' serial number, a username, an e-mail address, a phone number, an IMSI value, etc.

Examples of RAT values include, but are not limited to:

$$\text{RAT}=\{\text{Random Value}|\text{Hash(Credentials'Public Key)}\} \quad (Eq.1)$$

$$\text{RAT}=\{\text{Random Value}|\text{Hash(Credential's Certificate)}\} \quad (Eq.2)$$

$$\text{RAT}=\{\text{Random Value}|\text{UserName}\} \quad (Eq.3)$$

$$\text{RAT}=\{\text{Random Value}|\text{MAC Address}\} \quad (Eq.4)$$

$$\text{RAT}=\{\text{Random Value}|\text{Hash(eMailAddress)}\} \quad (Eq.5)$$

When public keys are used to exchange a common secret, the associated Diffie-Hellman or Diffie-Hellman (or any of its variations that are specific for the public-key algorithm used to generate the public keys—e.g., Elliptic-Curve Diffie-Hellman) parameters can be used to either derive the RAT or to directly encrypt the RAT value to protect it against eavesdropping.

As in the previous case, the derived value must be associated with the long-term credentials. This can be accomplished, for example, by combining the received RAT value with a unique identifier from the credentials' identity:

$$\text{RAT}=\{\text{DHParams}|\text{Hash(Credentials'Public Key)}\} \quad (Eq.6)$$

$$\text{RAT}=\{\text{DHParams}|\text{Hash(Credential's Certificate)}\} \quad (Eq.7)$$

$$\text{RAT}=\{\text{DHParams}|\text{UserName}\} \quad (Eq.8)$$

$$\text{RAT}=\{\text{DHParams}|\text{Hash(MAC Address)}\} \quad (Eq.9)$$

$$\text{RAT}=\{\text{DHParams}|\text{Hash(eMailAddress)}\} \quad (Eq.10)$$

While several different structures are shown for RATs herein, ones having skill in the art would understand that multiple other structures for RATs could be used with the systems and methods described herein.

Figure 2:
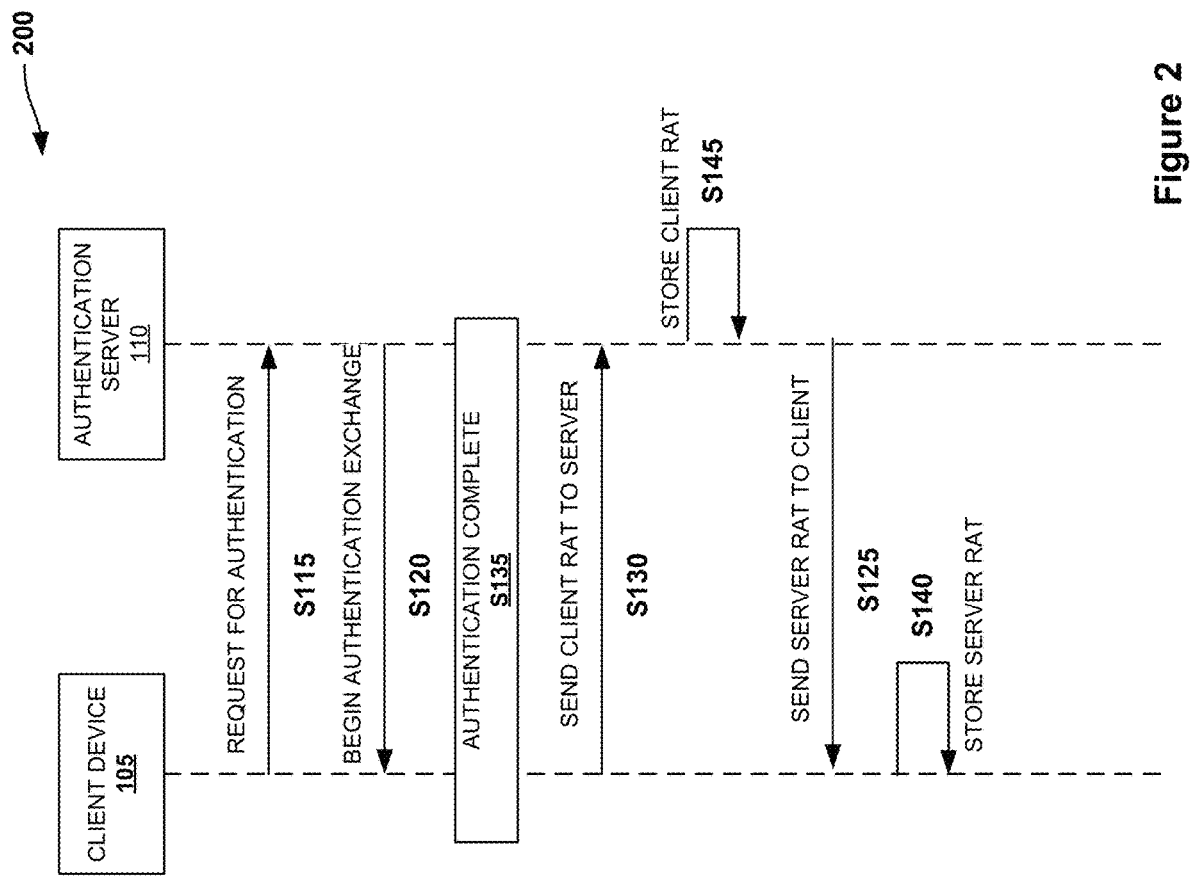
FIG. 2 illustrates a timing diagram of a process for sharing registration tokens between devices after authentication in accordance with at least one embodiment.

FIG. 2 illustrates a timing diagram of a process 200 for sharing registration tokens between devices after authentication in accordance with at least one embodiment. FIG. 2 illustrates a variation of process 100 (shown in FIG. 1), wherein instead the client device 105 and authentication server 110 trade RATs after the authentication has completed successfully, as shown in step S135.

Specifically, during the registration process (or the first authentication process, if the protocol does not explicitly have a registration step), the server and the client push the initial values for the registration authorization tokens to the other party.

In case any of the participating parties does not have valid credentials, thus making it impossible to authenticate its own RAT, the use of the registration authorization tokens is risky and should be avoided unless some additional form of anti-share protection is available in the deployment.

Many protocols allow for extensions to existing messages or the possibility to provide additional messages—if any of these options are provided, our invention leverages them to exchange the initial RATs and provide (optionally) updates for the initial values (e.g., TLS protocol extensions, DOCSIS message Attributes, DPP Messages).

If adding the possibility to exchange these values is not practical (the protocol does not allow for extensions or modifications), the advanced chained authentication and authorization system carries the additional values concatenated with the session-specific NONCE value in the NONCE field used in the protocol (if that can be extended in size).

In this case, the communicating party uses the NONCE field of the protocol and puts the concatenation of the NONCE and the Registration Authorization Token (or RAT) as the value (i.e., <NONCE|RAT>) of the field.

Since NONCE fields are usually generated by the client device 105 and replied by the server 110, the advanced chained authentication and authorization system requires that the server 110 sends, in addition to the client's NONCE and RAT, its own RAT value to allow the client device 105 to validate the network's registration:

$$\text{NONCE value}=\{\text{NONCE}|\text{RAT}_{client}|\text{RAT}_{server}\} \quad (Eq. 11)$$

Usually, the value in the NONCE must be identical. However, the advanced chained authentication and authorization system only extends the value while still including the original NONCE as shown above in Equation 11. The original NONCE still provides reply-attack protection and does not modify this property for existing protocols as it is safe to ignore the extra value—i.e., the $\text{RAT}_{server}$. In case the use of different NONCE values creates a problem for the protocol the client 105 and the server 110 can use the $\text{RAT}_{client}$ value for validating both client 105 and server 110 registration authorizations.

If the NONCE field cannot be extended to accommodate for the additional data, the initial NONCE value can be used as the registration authorization token for both the client 105 and the server 110.

Figure 3:
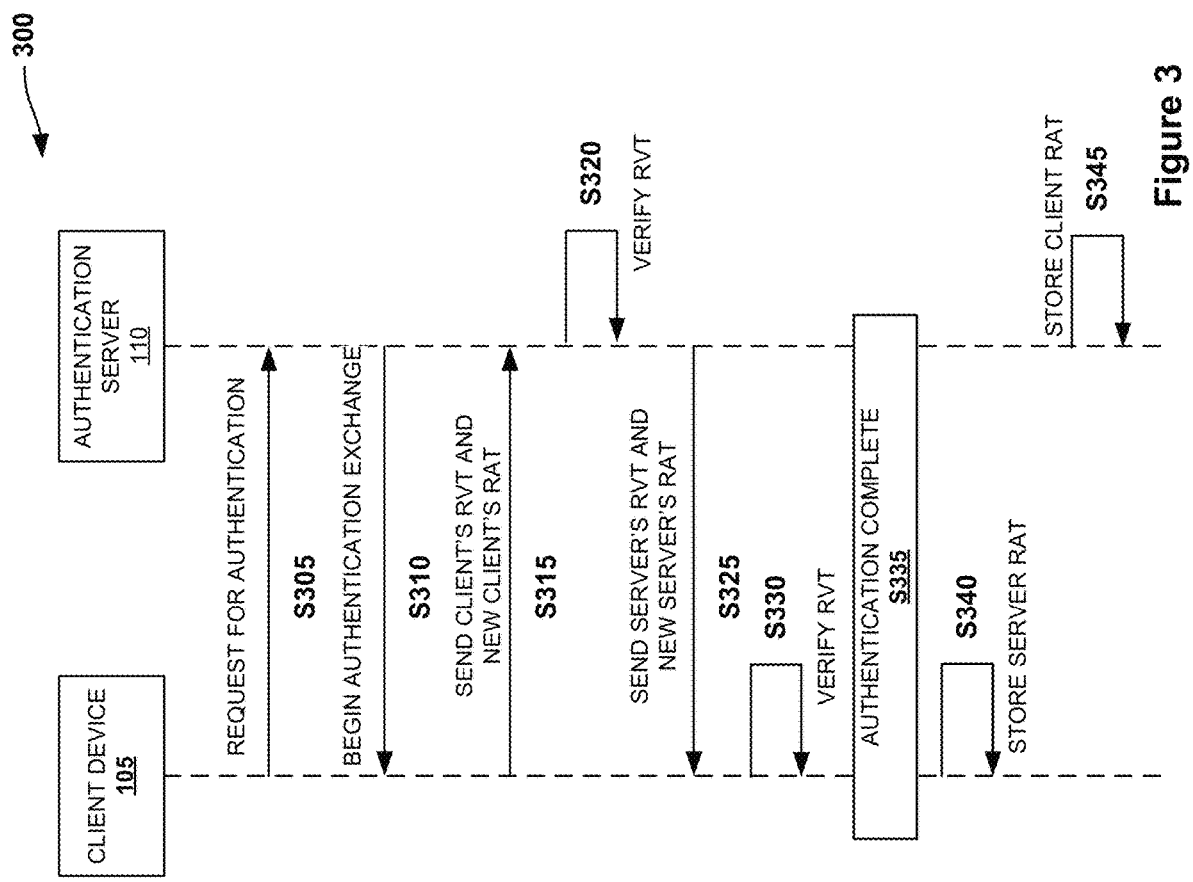
FIG. 3 illustrates a timing diagram of another process for sharing registration tokens between devices during authentication in accordance with at least one embodiment.

FIG. 3 illustrates a timing diagram of another process 300 for sharing registration tokens between devices during authentication in accordance with at least one embodiment.

Once the registration process is complete and the Registration Authorization Tokens (RAT) have been exchanged, as shown in processes 100 and 200 in FIGS. 1 and 2 respectively, the client device 105 can now proceed to authenticate to the network and also verify the registration authorization token as part of the process.

Process 300 illustrates a generic authentication flow is provided where the use of the new registration authorization token is used together with the session-specific NONCE to derive the value that the other party can verify.

Specifically, after generating the session-specific NONCE value, the communicating party also uses the session-specific NONCE value to calculate the session-specific RAT Validation token (RVT) as follows:

$$\text{RVT}=\text{Hash}(\{<\text{NONCE}>|<\text{RAT}>|<\text{YYYYMMDD}>\}) \quad (Eq. 12)$$

Where the value "YYYYMMDD" is the year, month, and day of the current date in GMT. In some embodiments, the value is omitted if the communicating party has no source of time that the communicating party can rely on.

Process 300 illustrates a successful authentication process, the communicating parties can provide updated values for the RATs to indicate that the original RATs must be updated. This could be needed if the identity details associated with the RAT have changed (making the validation of the original RATs impossible).

Processes 300 and 400 (shown in FIG. 4) illustrate typical authentication flows where two parties (client device 105 and authentication server 110 exchange the RVTs and proceed to validate the RVTs together with the authentication information.

In process 300, the client device 105 starts the authentication process by transmitting S305 a request for authentication message. In the exemplary embodiment, this authentication process is a repeated authentication process. For example, the client device 105 can be configured to reauthenticated every 10 minutes for the first three days that the client device 105 is connected to the network. The reauthentication process is in addition to the original, registration authentication process shown in FIGS. 1 and 2.

The server device 110 begins S310 the authentication exchange. During the authentication exchange, the client device 105 transmits S315 the client's RVT and a new RAT for the client. The server device 110 verifies S320 the RVT against the previously registered RAT and any necessary session data. When the RVT is verified, the authentication server 110 transmits S325 the server's RVT and the server's new RAT. The client device 105 verifies S330 the server's RVT against the server's previously registered RAT and any necessary session data. After the Authentication has completed successful S335, the client device 105 stores S340 the server's new RAT and the server 110 stores S345 the client's new RAT. Going forward the client device 105 and the server 110 will use the other's new RATs in future communications.

In process 300, since the RATs are exchanged during the authentication process, if the authentication process fails, the new RATs are discarded by both the client device 105 and the server 110. In this situation, the previously registered RATs stay in force.

Figure 4:
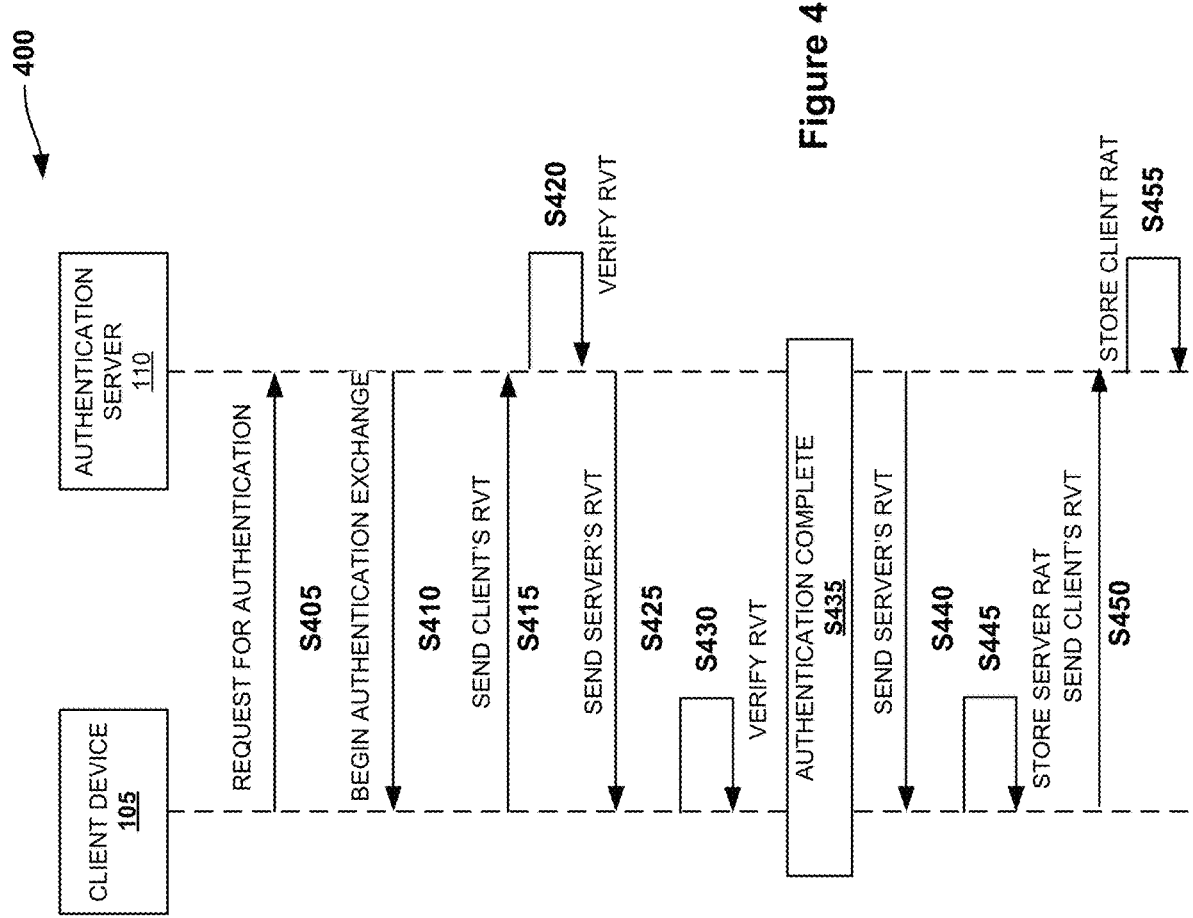
FIG. 4 illustrates a timing diagram of a process for verifying registration tokens between devices in accordance with at least one embodiment.

FIG. 4 illustrates a timing diagram of a process 400 for verifying registration tokens between devices in accordance with at least one embodiment. In process 400, the RATs are potentially exchanged after the authentication process.

In process 400, the client device 105 starts the authentication process by transmitting S405 a request for authentication message. In the exemplary embodiment, this authentication process is a repeated authentication process. For example, the client device 105 can be configured to reauthenticated every 10 minutes for the first three days that the client device 105 is connected to the network. The reauthentication process is in addition to the original, registration authentication process shown in FIGS. 1 and 2.

The server device 110 begins S410 the authentication exchange. During the authentication exchange, the client device 105 transmits S415 the client's RVT. The server device 110 verifies S420 the RVT against the currently registered RAT and any necessary session data. When the RVT is verified, the authentication server 110 transmits S425 the server's RVT. The client device 105 verifies S430 the server's RVT against the server's currently registered RAT and any necessary session data. After the Authentication has completed successful S435, the server 110 can transmit S440 a new RAT value to the client device 105. The client device 105 stores S445 the new RAT as the current RAT for the server 110. The client device 105 can transmit S450 a new RAT value to the server 110. The server 110 stores S455 the new RAT as the current RAT for the client 105. In some embodiments, steps S440 and S445 occur after steps S450 and S455. Going forward the client device 105 and the server 110 will use the other's new RATs in future communications.

In process 400, the two parties exchanged their RVTs as part of the authentication protocol and, instead of sending the new RATs within the authentication messages, the client 105 and server 110 exchanged their new RATs values AFTER the two parties have authenticated each other. Process 400 allows for encrypting the RATs with the session key (which is usually derived at the end of the authentication process) and not expose RATs values in the clear or to third parties that will fail the credentials validation.

The RVTs validation provides an indication that the entity using the credentials is the same that originally registered those credentials with the network, the communicating parties can still decide to proceed with the communication even when the RVTs validation fails. In that case, the communicating parties can, for example, log the exception and/or collect detailed information for later processing or for human review.

This advanced chained authentication and authorization system supports mutual authentication, server-side authentication only, or client-side authentication only. When credentials for a party are not available (e.g., the device does not have long-term credentials for the network or the network does not have long-term credentials), the advanced chained authentication and authorization system can be deployed in two different ways.

The first and more secure deployment strategy requires the entities that do not have valid long-term credentials to omit any RATs or Registration Validation Tokens (RVTs) from the messages. For example, a client device 105 that does not have long-term credentials but wants to "register" the network, the client device 105 can proceed with the registration procedures without sending its own RAT but still requiring the RAT from the network (i.e., authentication server 110). When the authentication is performed, the client device 105 will not send any RVT value while it still can validate the network's registration by using the server's RVT.

The second option is to apply all the procedures as described except for the generation and validation procedures of RVTs. Specifically, all generation and validation procedures can ignore any missing secrets from the calculations—i.e., when the identity of a node is used in the calculation of the RVT value and its validation, that value is not used as it does not exist. For example, if the client device 105 does not have long-term credentials, the registration procedures remain the same, while the validation ones remove the use of the client's missing credentials from the calculation. Specifically, in DPP both public keys of the Initiator and the Responder are used to calculate the RVT— when the public key of the Initiator or of the Responder are missing (BI or BR are not available), the corresponding field carrying its SHA256 value is simply omitted.

In some embodiments, the advanced chained authentication and authorization system supports exchanging the Registration Tokens via an out of band mechanism (e.g., the user retrieves the registration token's value from the service provider's website or it received it as part of the account setup procedures with the service provider), in this case the RAT value is not provided in-band but must be configured otherwise (e.g., the user can provide the value via a user interface or via a network-configuration tool).

The advanced chained authentication and authorization system allows for updating the RATs after (or as part of) a successful authentication, as shown in processes 300 and 400. Specifically, the communicating parties, may provide updated RATs value by adding the extra field in the communication protocol's message(s) or by extending the use of existing fields as in the case of the NONCE. Specifically, the value of the new RAT can be concatenated to the NONCE value when needed. For example, a newly updated RAT can be communicated by a client as follows:

$$\text{NONCE}_{value}=\{\text{NONCE}|\text{RVTclient}|(\text{new})\text{RAT}_{client}\} \quad \text{(Eq.13)}$$

The server, can communicate its own updated RAT to the client by sending the following value in the NONCE field of the authenticated protocol:

$$\text{NONCE}_{value}=\{\text{NONCE}|\text{RVTserver}|(\text{new})\text{RAT}_{server}\} \quad \text{(Eq.14)}$$

If the authentication is successful, the communicating parties can then update the RATs values with the ones received during (or after) a successful authentication. In case, instead, the authentication is not successful (i.e., either the credentials are not verified or the RVT value is incorrect), the communicating party must discard the new RAT values as "compromised" and start the process again.

The advanced chained authentication and authorization system protects the new value of the RAT. For this protection, clients 105 and servers 110 may encrypt the values of the RAT to prevent its disclosure to third parties. This can be done by leveraging the other party's identity credentials and either directly encrypt the value if the public-key algorithm supports it (i.e., rsaEncrypt) or use a key-derivation algorithm like Diffie-Hellman or Elliptic-Curves Diffie-Hellman to derive the encryption key.

ACAAS FOR DOCSIS

The advanced chained authentication and authorization system can be integrated into DOCSIS 4.0 in at least two different ways. First, when BPI+V2 is used, the NONCE field can be extended as described above to include the extra information coming from the CM (cable modem) and from the CMTS (cable modem termination system).

The second method for adding the advanced chained authentication and authorization system to DOCSIS 4.0 is to leverage the support for new Attributes that can be added to existing messages. Specifically, the advanced chained authentication and authorization system defines two new Attributes: The Registration-Authorization-Token and the Registration-Validation-Token. These two attributes are specifically added to the Authorization Request and Authorization Reply messages. The two messages include a type field, a length field, and a string. In the messages, the type field is set to TBD. The string field is filled with the binary value of the RAT or the RVT depending on when the message is sent in processes 300 and 400. For the Registration Authorization Token (RAT) the value is the binary representation of the Registration-Authorization-Token transferred during the registration that will be used to validate the registration status of the device. For the Registration Validation Token (RVT) the value is the binary representation of the Registration-Validation-Token that is used to validate the registration status of the device during the authorization process.

DOCSIS 3.1 and earlier versions do not support the use of NONCE values to protect against reply-attacks. However, the advanced chained authentication and authorization system can be supported using the second method for version 4.0, described above.

The advanced chained authentication and authorization system can be implemented using the TLS protocol. The TLS protocol defines extensions that allow additional values to be exchanged as part of the authentication framework. Accordingly, these values can be the RAT and RVT. Examples for extensions definitions are available in RFC 6066.

Without this extension, TLS specifies that, during the TLS handshake, when client or server authentication is performed, the validation process is aimed at establishing if the certificates are valid (not expired and not revoked) and trusted (chained to a trusted Root Certificate Authority (CA)). The advanced chained authentication and authorization system augments the validation process by requiring the use of two extensions—the Rat_data and the rvt_data that transport the RAT and RVT respectively.

In these embodiments, clients 105 and servers 110 use an extended client hello containing the "rat_data" during the first connection to the other party (credentials registration) when requesting the network to support the advanced chained authentication and authorization system. Clients 105 and Servers 110 also use an extended client hello containing the "rvt_data" during the authentication process when authenticating to networks that support the advanced chained authentication and authorization system.

When receiving an extended hello message with the "rat_data," receiving clients 105 and servers 110 first verify that the other party is not already "registered", if the other party is already registered, the receiving client 105 or server 110 should reject the message. When receiving an extended hello message with the "rvt_data" extensions, the receiving clients 105 and servers 110 first verify that the specific credentials (identity) was previously registered. If the relying party does not have any RAT associated with the credentials used in the authentication, the relying party logs the event and may reject the connection with the device, especially if credentials sharing is to be enforced.

In order to transfer the RAT to the other party, clients 105 and servers 110 MAY include an extension of type "rat_data" in the (extended) client hello. The "extension_data" field of this extension contains "RATData." For example, the extension may include:

```
struct{
   IdentifierType identifier;
   select (identifier) {
      DHParams PubValue (64 . . . 8192);
      opaque SecretValue (1 . . . 1024);
      opaque EncSecret (1 . . . 1024);
   }
} RATData
enum {
   DHParams(0), SecretValue(1), EncSecret(2)
} IdentifierType;
struct {
   NamedGroup algor;
   opaque value;
} DHParams;
enum {
   /* ECDHE Groups */
   secp256r1(0x0017), secp384r1(0x0018), secp521r1
      (0x0019),
   /* Finite Field Groups (DHE) */
   ffdhe2048(0x0100), ffdhe3072(0x0101), ffdhe4096
      (0x0102),
   ffdhe6144(0x0103), ffdhe8192(0x0104)
} NamedGroup;
```

In the above code snippet, the SHA256 is calculated over the parameter used to identify the client (i.e., the client or server's identity). This value can be calculated over the entire value of the X.509 certificate or on its public key or, again, over its Subject DN (Distinguished Name) value. This value is used to make sure that the RAT is associated with the identity it is supposed to provide authorization validation for.

When the Communicating Parties (i.e., the Client 105 and the Server 110) are already registered (i.e., a valid RAT associated with the credentials has already been exchanged or configured), on top of validating the other party's credentials, the client 105 and server 110 verify that a RAT is available for the associated credentials and that the RVT sent by the other party can be verified with the RAT. This step is important to prevent the sharing of the RAT values across devices.

In order to transfer the validation token to the other party (the RVT), clients and servers MAY include an extension of type "rvt_data" in the (extended) client and server hello. The "extension_data" field of this extension contains "RVT-Data." For example, the extension may include:

Struct {
  opaque randomValue; /* N bytes */
  opaque SHA256Hash; /* 32 bytes */
  opaque dateStamp; /* 8 bytes */
} RVTData Where the randomValue is the original NONCE required by the protocol. If the protocol already provides a separate field that carries the NONCE, the randomValue can be omitted. The SHA256 is calculated, at minimum, over the NONCE inside the message (in a separate field or as part of the RVT) and the RAT value.

When the RVT value is processed, the relying party also checks that the identifier associated with the original RAT (e.g., the HASH of the other party's certificate) matches in the current authentication process. This additional step is there to make sure that the RAT is used only in conjunction with the identity it is supposed to provide registration authorization information for.

The dataStamp is the value that was used to calculate the RVT value together with the original NONCE and the RAT value. The dateStamp format is "YYYYMMDD" and carries the Year, Month, and Day (GMT) in their decimal representation. For example, to express the date Jun. 18, 2020, the value of the dateStamp must be set to "20200618".

ACAAS FOR DPP

The advanced chained authentication and authorization system also supports the Device Provisioning Protocol Specifications (DPP) from WiFi Alliance. In the DPP, the Initiator and the Responder exchange DPP Authentication Request and DPP Authentication Response messages.

While connecting for the first time, the DPP Configuration Request and DPP Configuration Response can be augmented to carry the RAT data. Specifically, the use of the E-nonce can be leveraged to transfer RATs and RVTs or new attributes can be defined.

In some embodiments, additional attributes cannot be added to the DPP message(s) in the form of configAttrib values. In these embodiments, the advanced chained authentication and authorization system embeds the RAT in the E-nonce value directly. Specifically, the DPP configuration request from the Enrollee to the Configurator is as follows:

Enrollee→Configurator:{$E$-nonce,configAttrib}$_{ke}$

In this case, the E-nonce value is enhanced as follows:

$E$-nonce={RandomValue|RAT$_{Enrollee}$} where the Size of the RandomValue could be determined by using Table 3 from section 3.2.2 of DPP specifications.

The same approach can also be used for the DPP Configuration Response message from the server where the E-nonce is augmented with its own RAT. Specifically, the new E-nonce from the Configurator is as follows:

$E$-nonceConfigurator={$E$-nonce$_{Enrollee}$|RATConfigurator}

In other embodiments, additional attributes can be defined. In these embodiments, the advanced chained authentication and authorization system defines a new "rvt" attribute to carry the Base64 encoded value of the RVT. Specifically, for the DPP Configuration Attributes, Table 12 from Section 6.3.4.2 can be augmented with the following new attribute: {Parameter: Registration Authorization Token; Name: rat; Type: STRING; Value: Base64 encoded value of the RVT; and Description: RAT for communicating party.

The Configurator then sends back the configuration object to the enrollee. Also in this case, the RAT can be transferred by encoding it via the E-nonce or via a separate attribute exactly as for the DPP Configuration Request.

After registration, the DPP protocol allows the advanced chained authentication and authorization system to use the I-nonce in the protocol's messages. This field has variable length and can be adapted to allocate enough space to hold the additional RVT data. Also in this case, the advanced chained authentication and authorization system transfers the RVT data both by augmenting the I-nonce as specified for RAT data in DPP Configuration Request messages or by using a separate "rvt" attribute in the responder's or the initiator's capabilities objects (I-capabilities and R-capabilities).

The calculation of the RVT on the Initiator is as follows:

$$\text{RVT}_{Initiator}=\text{SHA256}(\text{RAT}_{Responder}|\text{SHA256}(B_R)|\text{SHA256}(B_I)|I\text{-nonce}) \quad \text{(Eq. 15)}$$

where $B_R$ is the Public Key of the Responder, $B_I$ is the Public Key of the Initiator, and the I-nonce is the nonce used in the DPP authentication request/response messages. The RAT$_{Initiator}$ carries the secret value generated during registration. In case $B_R$ or $B_I$ are not present, their SHA256 value is not added to the concatenation of values that is used to calculate the RVT$_{Initiator}$ value. By using the I-nonce value to transfer the RVT, its value (for possible updates) is protected against eavesdropping and, therefore, secure.

The calculation of the RVT on the Responder is as follows:

$$\text{RVT}_{Responder}=\text{SHA256}(\text{RAT}_{Initiator}|\text{SHA256}(B_R)|\text{SHA256}(B_I)|I\text{-nonce}) \quad \text{(Eq. 16)}$$

where $B_R$ is the Public Key of the Responder, $B_I$ is the Public Key of the Initiator, and the I-nonce is the nonce used in the DPP authentication request/response messages. The RAT$_{Responder}$ carries the secret value generated during registration. In case $B_R$ or $B_I$ are not present, their SHA256 value is not added to the concatenation of values that is used to calculate the RVT$_{Responder}$ value). By using the I-nonce value to transfer the RVT, its value (for possible updates) is protected against eavesdropping and, therefore, secure When performing only one-side authentication, the advanced chained authentication and authorization system omits the corresponding missing values for the calculation of the RVT. For example, when no public key is available for the Initiator, the Initiator's RAT cannot be shared with the Responder because it cannot be tied to a verifiable identity. In this case, the DPP Authentication Request message would not contain any RVT data. Similarly, for the reverse situation, when no public key is available on the Responder, the RAT cannot be securely shared with the Initiator and, therefore, DPP Authentication Response messages would not have, in this case, the RVT data in it.

ACAAS FOR 802.1X

The advanced chained authentication and authorization system also supports 802.1x authentication. The advanced chained authentication and authorization system alters the message structure depends on the specific EAP mechanism used to validate the credentials.

EAP-TLS and EAP-TTLS support the extensions mechanism defined in TLS (Transport Layer Security). In this case, the advanced chained authentication and authorization system leverages the use of TLS extensions as defined in to provide advanced chained authentication support in EAP-TLS and EAP-TTLS.

EAP-TEAP makes use of extensible NONCE values to provide reply-attack protection. The NONCE field can be enhanced to support transferring RATs and RVTs. On top of that, EAP-TEAP provides the possibility to extend the protocol by defining additional TLVs (type-length-values) that can be used during the authentication phase. For this use, we use a similar definition for the TLVs as defined for the DOCSIS protocol.

For EAP-TEAP, the advanced chained authentication and authorization system defines two new Attributes: The Registration-Authorization-Token and the Registration-Validation-Token. These two attributes include a type field, a length field, and a string. In the messages, the type field is set to TBD. The string field is filled with the binary value of the RAT or the RVT depending on when the message is sent in processes 300 and 400. For the Registration Authorization Token (RAT) the value is the binary representation of the Registration-Authorization-Token transferred during the registration that will be used to validate the registration status of the device. For the Registration Validation Token (RVT) the value is the binary representation of the Registration-Validation-Token that is used to validate the registration status of the device during the authorization process.

ACAAS FOR 3GPP

The advanced chained authentication and authorization system also supports 3gpp networks. 3gpp networks provide the possibility to authenticate network and CPE by using a shared secret that is stored on the USIM, in the CPE, and in a secure server in the operator's home network. In 3gpp authentication messages, two separate random values are used with the different versions of AKA to provide the authentication challenges for both the CPE and the Network. In case new message types for the RAT and the RTV cannot be defined, the values for the CPE and Network challenges can be used to carry the additional data (the registration authentication and validation tokens).

Given the mobile nature of 3gpp, the deployment of the system, the bonding of the RAT to credentials that might be specific for the eNodeB/eNodeG or MME used might prevent future CPE validation of network credentials. In this case, the advanced chained authentication and authorization system can leverage the roaming infrastructure of 3gpp where authentication requests are forwarded to the home network. To avoid this problem, the server's RAT value could be associated with a global "home" network identity which can be in the form of a X.509 certificate, a public key, or a shared secret. This initial value can be provided out-of-band (similarly to what happens in DPP) and securely embedded in the authentication parameters stored on the USIM.

Provisioning credentials to devices can be expensive. The process itself can require manufacturers to setup complex provisioning systems that might require integrating with external providers (e.g., a Certification Authority). The advanced chained authentication and authorization system can allow for the same credentials to be used across an entire ecosystem and still be able to provide per-device specific services after device registration. Specifically, when the same set of credentials is used by different entities, the registration system cannot differentiate among them—this is a problem for providers that want to enable different parameters or services for the specific entities but do not have trusted data the providers can rely on to differentiate among the devices and leverage the RVTs to possibly deliver the long-term provider-specific/application-specific credentials.

In new or existing ecosystems, when new entities are added to the environment, usually a new set of valid ecosystem credentials are issued to the new entities to allow the entities to authenticate to the resources they need to access of the ecosystems are initialized with a set of shared credentials. In the advanced chained authentication and authorization system, the set of credentials that are provisioned to new entities can be shared. Specifically, after the initial provisioning of the shared credentials, the entity can successfully authenticate with these credentials to the service to register them. Through processes 100 and 200, entities can register to, for example, a cloud provider—by using different RATs during the registration process, the cloud provider can associate sessions to different accounts based on their RVTs.

When an advanced chained authentication and authorization system is deployed, devices could potentially re-register over and over again thus resulting in system abuse and potential denial of service. In case this is a possible threat for the specific environment, to avoid this situation, the registration step may require the use of an additional authorization token that should be pre-provisioned on the device (e.g., via a portal where the one-time registration token can be retrieved for each new device that share the same credentials).

After the RATs are deployed, subsequent authentications allow the service provider to distinguish across entities and, therefore, provide specialized services. One possibility offered by the use of RVTs is to leverage them to re-provision the shared credentials with the network-specific ones. In particular, RVTs can be used to prove the possession of a RAT that can be associated with, as we discussed in the previous section, a user account or a specific class of service. Specifically, after a successful initial registration, the communicating party may decide that the presented credentials (since they are shared) should be replaced. The RVTs can be used to directly associate the new credentials with the right account information.

From this moment on, the entity can use the newly provisioned (not shared) credentials to authenticate to the other party, the use of RATs and RVTs still provides the entity's specific registration authorization and validation tokens, while the old shared credentials are not needed anymore.

Figure 5:
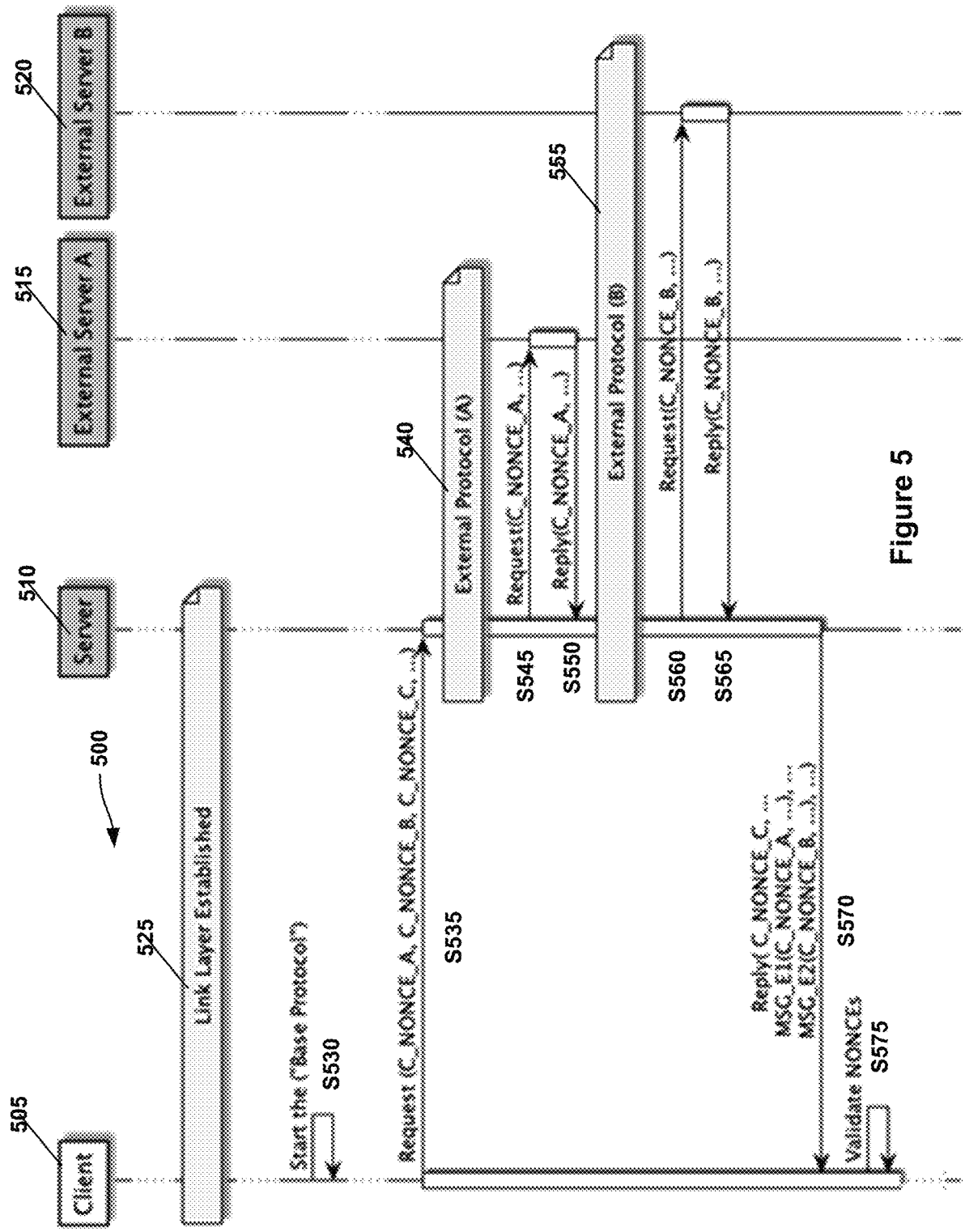
FIG. 5 illustrates a timing diagram of process for protecting network devices from reply-attacks in accordance with at least one embodiment.

FIG. 5 illustrates a timing diagram of process 500 for protecting network devices from reply-attacks in accordance with at least one embodiment. In process 500, a client 505 is in communication with a server 510, where the server 510 is in communication with External Server A 515 and External Server B 520.

For the purposes of process 500, client 505 and server 510 have established a link layer connection 525. Then the client 505 initiates S530 the base protocol. The base protocol is the protocol that the client 505 and server 510 used to establish a connection. The server 510 is any entity that acts as the server in the base protocol. For example, the server 510 can be, but is not limited to, the CMTS or CCap (Converged Cable Access Platform) Core in the DOCSIS protocol, the MME/HSS (Mobility Management Entity/Home Subscriber Server) in 3gpp networks, or a generic TLS server. The client 505 is the entity that is connecting to the server 510. Typically, the client 505 initiates the communication. Examples of this type of entities are Cable Modems, Cell Phones, or Computers/Laptop/IoT/etc.

The client 505 transmits S535 a request to the server 510. The request may include a plurality of NONCES to be used in process 500. In the exemplary embodiment, External Server A 515 is in communication with server 510 via External protocol A. External Server B 520 is in communication with server 510 via External protocol B. These protocols are an additional protocol used in support of the Base Protocol. For example, the support protocol can be used to convey revocation information related to the server's certificate or to provide secure time to the client. The External Servers A 515 & B 520 provide the messages from the External Protocol. The External Servers A 515 & B 520 are usually contacted by one of the parties communicating in the Base Protocol and includes the messages from the External Servers A 515 & B 520, in the Base Protocol.

Typically, the Base Protocol and the External Protocol can implement Reply-Attacks protection mechanisms that make use of NONCEs or Random Values to guarantee that Responses are properly "tied" to the corresponding Requests. The server 510 uses the NONCEs provided by the client 505 in its Response to protect the protocol's messages.

Specifically, when the client 505 sends a request to the Server 510, as shown in Step S535, the request will include one or more NONCEs that are to be used by the Server 510 to guarantee that all the data included in the Response of the Base Protocol is fresh and protected against reply attacks. The server 510 uses the NONCEs sent by the client 505 when sending the request to the External Server A 515 & B 520 via the External Protocol. This approach extends the Reply-Attack protection and allows the Client 505 to be sure that all the protocols used in generating the Base Protocol's messages are "fresh" because it provides the Client 505 with verifiable data. This method provides protection as long as the NONCEs generated by the Client 505 and used by the Server 510 are sufficiently random. Process 500 greatly enhances the possibility for the Client 505 to validate the freshness of the information used in a multi-protocol system.

As shown in process 500, server 510 is in communication with External Server A 515 via External Protocol A 540. Server 510 transmits S545 a request to External Server A 515 which includes a NONCE from the request message from the client 510. The External Server A 515 replies S550 using the provided NONCE. Server 510 is also in communication with External Server B 520 via External Protocol B 555. Server 510 transmits S560 a request to External Server B 520 which includes a NONCE from the request message from the client 510. The External Server B 520 replies s565 using the provided NONCE.

The server 510 uses the provided NONCE it its reply message s570 to the client 505. The client 505 validates s575 the NONCEs to determine the freshness of the reply messages from the server 510.

As shown in FIG. 5, the server 510 uses a different provided NONCE for each External Server A 515 & B 520. In some other embodiments, the server 510 uses a different NONCE for each communication with an external server or client 505. For example, the request message S545 includes the first provided NONCE, the request message S560 includes the second provided NONCE, and the reply message S570 includes the third provided NONCE.

Figure 6:
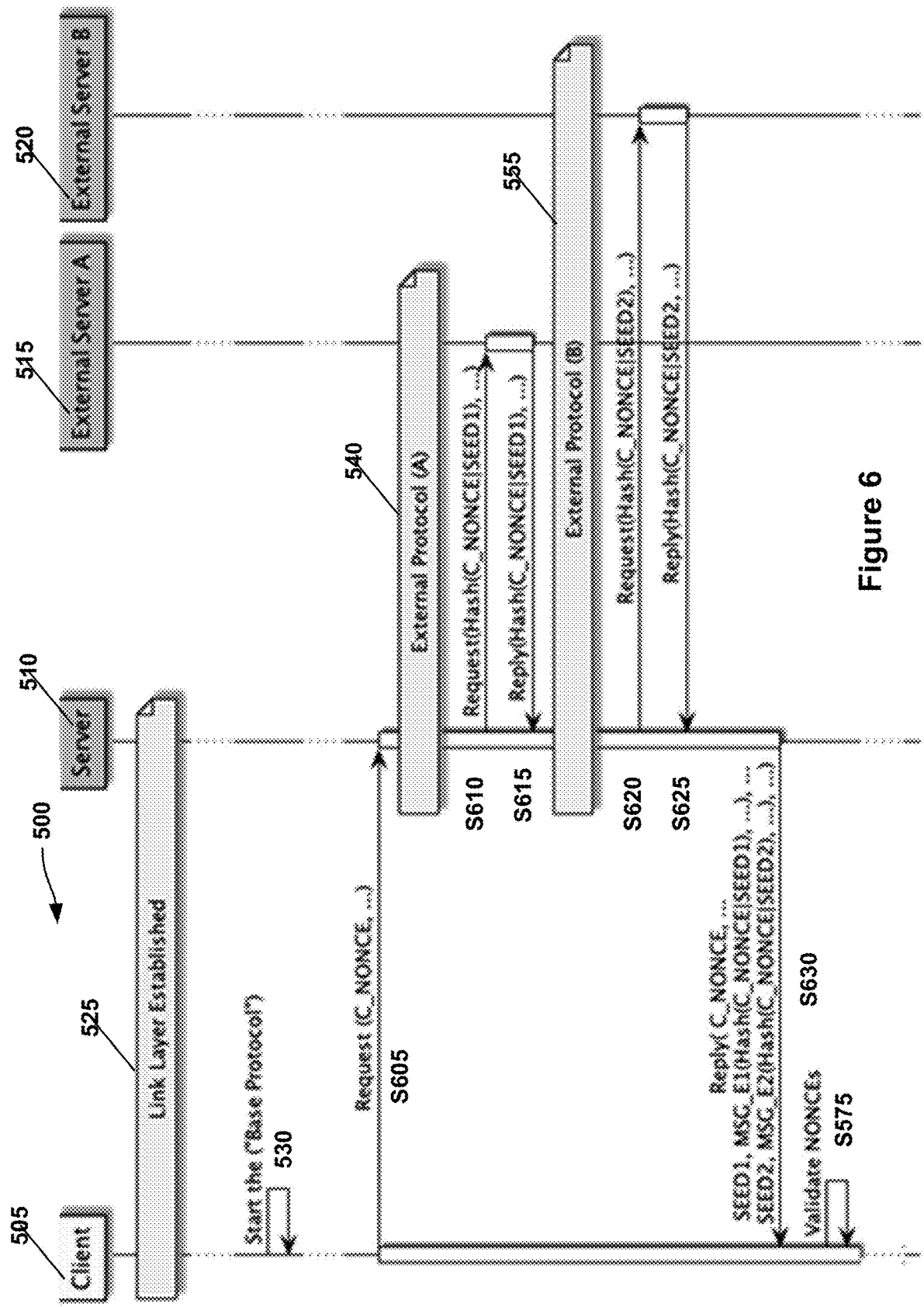
FIG. 6 illustrates a timing diagram of an alternative process for protecting network devices from reply-attacks in accordance with at least one embodiment.

FIG. 6 illustrates a timing diagram of another process 600 for protecting network devices from reply-attacks in accordance with at least one embodiment. In process 600, a client 505 is in communication with a server 510, where the server 510 is in communication with External Server A 515 using External Protocol A 540 and External Server B 520 using External Protocol B 555.

Process 600 illustrates where the Base Protocol only provides the possibility for the Client 105 to send a single NONCE to the Server 110, the Server 110 can use the same NONCE in the Requests sent to different External Servers A 515 & B 520. The request S605 from the client 105 to the server 110 includes a single NONCE.

When this option is not possible or different sizes of NONCEs are required in the different External Protocols A 540 & B 555 that are used to support the Base Protocol or, again, if the tracking of different requests to different protocols might create security or privacy concerns, the Server 110 can use one-way functions to derive the different NONCEs used there in the request S610 from the server 110 to the External Server A 515 and the request S620 from the server 110 to the External Server B 520.

In the case for requests S610 and S620, the server 110 builds the NONCE for the External Protocols A 515 & B 520 in a specific way by to by reserving a two bytes prefix. The first byte of the NONCEs carry an identifier that indicates which algorithm was used to derive the rest of the NONCE from the Client's one. The second byte is just a random value that is used in the computation of the rest of the value to guarantee uniqueness when multiple External Protocols External Protocols A 515 & B 520 are used. The second octet can be implemented as a +1 increment starting from a random value (0-255) to make sure all generated NONCEs are unique for each request S610 and S620 sent to the External Protocols A 515 & B 520.

For example, if the NONCE sent by the Client 505 in request S605 is "AAAA", then the NONCE used by the server 110 can be a value calculated via the SHA-256 algorithm (e.g., SHA256(algor|counter|AAAA)) and prepended it with an octet carrying the value for the 2 octet prefix that carries the "algorithm identifier" and the "random value/counter" respectively). The SEED for calculating the Hash defined as:

$$\text{SEED}::=\text{Algor}|\text{Counter} \quad \text{(Eq. 17)}$$

And, therefore, the NONCE used by the Server 110 in the External Protocol A 540 and B 555 can be rewritten as the Hash of the concatenation of the SEED and the NONCE as follows:

$$\text{NONCE\_EXT\_PROTOCOL}::=\text{Hash}(\text{SEED}|\text{CLIENT NONCE}) \quad \text{(Eq. 18)}$$

In the above example his would be translated to:

$$\text{NONCE\_EXT\_PROTOCOL}::=\text{Hash}(\text{SEED}|\text{AAAA}) \quad \text{(Eq. 19)}$$

A typical use-case of the above approach can be depicted in access networks where devices that are authenticating the network require additional information (e.g., secure time, revocation information, configuration options, etc.) and cannot gather that information directly as they still have no access to routable protocols. When devices send their requests and use NONCEs to protect against Reply-Attacks, these NONCEs (or the derived NONCEs) can be used to: a) retrieve a Secure Time token from a secure time server that the device can trust; b) retrieve the revocation status of the Server's certificate (or other certificates needed by the client); and c) retrieve the status of the latest firmware update available for the device.

When the client receives the reply S630 in the Base Protocol it can now verify the freshness not only of that message, but also of the messages the Base Protocol relies to for delivering extra information securely. The client 505 validates S575 the NONCEs to determine the freshness of the reply messages from the server 510.

The above descriptions of FIGS. 5 and 6 use the DOCSIS® protocol as an example of the base protocol used by the communicating parties while the OCSP protocol is used as an example of the additional protocol used to convey information used in the first protocol (e.g., a CMTS providing the OCSP responses for its own certificate to the Cable Modem in BPI+V2). The principles described above apply to any protocol that leverages a second protocol where the communicating party does not use (or have access to) the second protocol directly like in the case of a TLS server providing the OCSP responses (stapling) to the TLS client or an EAP-TLS server providing revocation information to the EAP peer.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., time variant parameters, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity of broadcast messages and timestamps at the server-side, and by further enabling the easier and more efficient verification of a received broadcast message at the client-side. The present embodiments therefore improve the speed, efficiency, and reliability in which such determinations and processor analyses may be performed. Due to these improvements, the aspects described herein address computer-related issues that significantly improve the security of broadcasting messages in comparison with conventional techniques. Thus, the aspects herein may be seen to also address computer-related issues such as communication security between electronic computing devices or systems, for example.

Exemplary embodiments of systems and methods for broadcast messaging protection are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A server device for authenticating client devices on a communication network, comprising:
   a transceiver configured for operable communication with at least one client of the communication network;
   a processor including a memory configured to store computer-executable instructions, which, when executed by the processor, cause the server device to:
   transmit one or more messages of an authentication exchange with a client device;
   transmit a server Registration Authorization Token (RAT) associated with the server device to the client device, the server RAT includes a concatenation of identifiers for the server device;
   receive, from the client device, a client RAT associated with the client device, the client RAT includes a concatenation of identifiers for the client device, wherein the identifiers for the server device are different than the identifiers for the client device; and store the client RAT.

2. The server device of claim 1, wherein a message transmitted from the client device includes a predetermined NONCE message field, and wherein the instructions further cause the server device to retrieve the client RAT from the NONCE message field.

3. The server device of claim 1, wherein a message transmitted from the server device to the client device includes a predetermined NONCE message field, and wherein the instructions further cause the server device to store the server RAT in the NONCE message field.

4. The server device of claim 3, wherein the NONCE message field includes a NONCE and the server RAT.

5. The server device of claim 1, wherein the server RAT is transmitted after the authentication exchange is completed successfully.

6. The server device of claim 1, wherein the client RAT is transmitted during the authentication exchange.

7. The server device of claim 1, wherein the client RAT is stored only if the authentication exchange was successful.

8. The server device of claim 1, wherein the instructions further cause the server device to:
receive, from the client device, a message containing a RAT Validation token (RVT), wherein the RVT includes a hash of at least a NONCE and the client RAT;
compare the RVT to the stored client RAT to validate the RVT; and
if the RVT is validated, approve the message that contained the RVT.

9. The server device of claim 8, wherein the message includes a new client RAT wherein the instructions further cause the server device to store the new client RAT if the RVT is approved.

10. The server device of claim 8, wherein the RVT includes a hash that includes at least the client RAT and a timestamp, and wherein the instructions further cause the server device to validate the RVT and the timestamp.

11. The server device of claim 10, wherein the hash further includes a session specific NONCE.

12. The server device of claim 1, wherein the instructions further cause the server device to:
generate a RAT Validation token (RVT) including a hash of the server RAT; and
store the RVT in a NONCE message field of a message to transmit to the client device.

13. A server device for facilitating communication between devices on a plurality of networks, comprising:
a transceiver configured for operable communication with at least one client of a first communication network and an external computer device of a second communication network;
a processor including a memory configured to store computer-executable instructions, which, when executed by the processor, cause the server device to:
establish a connection with a client device on the first communication network;
receive a first message from the client device, wherein the first message includes a plurality of NONCEs including at least a first NONCE and a second NONCE, wherein the first NONCE is different from the second NONCE;
transmit a second message to the external computer device on the first communication network, wherein the second message is based on the first message and transmitted subsequent to receiving the first message, and wherein the second message includes the first NONCE from the first message;
receive a third message from the external computer device, wherein the third message is in response to the second message, and wherein the third message includes the first NONCE from the first message; and
transmit a fourth message to the client device in response to and subsequent to receiving the third message, wherein the fourth message includes the second NONCE from the first message and at least a portion of the third message.

14. The server device of claim 13, wherein the client device is configured to validate the second NONCE.

15. The server device of claim 13, wherein the fourth message also includes the first NONCE from the first message.

16. The server device of claim 13, wherein the first message includes a request for the server device, and wherein the fourth message includes a response to the request.

17. The server device of claim 13, wherein the second message includes a request for the external computer device, and wherein the third message includes a response from the external computer device.

18. A server device for facilitating communication between devices on a plurality of networks, comprising:
a transceiver configured for operable communication with at least one client of a first communication network and an external computer device of a second communication network;
a processor including a memory configured to store computer-executable instructions, which, when executed by the processor, cause the server device to:
establish a connection with a client device on the first communication network;
receive a first message from the client device, wherein the first message includes a first NONCE;
generate a second NONCE using an algorithm and the first NONCE in response to receiving the first message, wherein the first NONCE is different from the second NONCE;
transmit a second message to the external computer device on the first communication network, wherein the second message is based on the first message, and wherein the second message includes the second NONCE;
receive a third message from the external computer device, wherein the third message is in response to the second message, and wherein the third message includes the second NONCE from the second message; and
transmit a fourth message to the client device in response to and subsequent to receiving the third message, wherein the fourth message includes the second NONCE from the second message, the first NONCE from the first message, and at least a portion of the third message.

19. The server device of claim 18, wherein the second NONCE includes an identifier for the algorithm, a random value, and a generated section based on the first NONCE, the random value, and the algorithm.

20. The server device of claim 18, wherein the client device is configured to validate the first NONCE and the second NONCE in the fourth message.

* * * * *